(12) United States Patent
Lin et al.

(10) Patent No.: US 12,225,205 B2
(45) Date of Patent: Feb. 11, 2025

(54) BLOCK-WISE ENTROPY CODING METHOD IN NEURAL IMAGE COMPRESSION

(71) Applicant: TENCENT AMERICA LLC, Palo Alto, CA (US)

(72) Inventors: Sheng Lin, San Jose, CA (US); Wei Jiang, Sunnyvale, CA (US); Shan Liu, San Jose, CA (US); Wei Wang, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 27 days.

(21) Appl. No.: 17/825,575

(22) Filed: May 26, 2022

(65) Prior Publication Data

US 2022/0408098 A1    Dec. 22, 2022

Related U.S. Application Data

(60) Provisional application No. 63/212,469, filed on Jun. 18, 2021.

(51) Int. Cl.
*H04N 19/149*    (2014.01)
*H04N 19/176*    (2014.01)
(Continued)

(52) U.S. Cl.
CPC ......... *H04N 19/149* (2014.11); *H04N 19/176* (2014.11); *H04N 19/60* (2014.11); *H04N 19/91* (2014.11)

(58) Field of Classification Search
CPC .... H04N 19/176; H04N 19/52; H04N 19/119; H04N 19/105; H04N 19/70; G06T 7/223; G06T 2207/20021; G06T 9/40
See application file for complete search history.

(56) References Cited

U.S. PATENT DOCUMENTS 10,303,980 B1 *   5/2019   Kim ...................... G06F 18/217
10,311,321 B1 *   6/2019   Kim .......................... G06N 3/04
(Continued)

FOREIGN PATENT DOCUMENTS

JP    2-303220 A    12/1990
JP    3-77477 A    4/1991

OTHER PUBLICATIONS

Extended European Search Report dated Jun. 14, 2023 in Application No. 22800557.5.
(Continued)

*Primary Examiner* — Daniel Chang
(74) *Attorney, Agent, or Firm* — Sughrue Mion, PLLC (57) ABSTRACT

Systems and methods for block-wise entropy coding methods in neural image compression is provided. A method includes: receiving a bitstream that includes an image; partitioning the image into a plurality of blocks; compressing each of the plurality of blocks by a neural network-based encoder; obtaining compressed features by obtaining a compressed feature for each block from among the plurality of blocks in the image; processing the compressed features by an entropy encoder to generate a first compressed bitstream; obtaining a plurality of reshaped compressed features by concatenating the compressed features; processing the plurality of reshaped compressed features by the entropy encoder to generate a second compressed bitstream; and encoding the bitstream including the image based on the second compressed bitstream.

8 Claims, 9 Drawing Sheets

(51) Int. Cl.
*H04N 19/60* (2014.01)
*H04N 19/91* (2014.01)

(56) References Cited

U.S. PATENT DOCUMENTS

| | | | |
|---|---|---|---|
| 10,311,324 B1* | 6/2019 | Kim | G06V 20/58 |
| 10,387,754 B1* | 8/2019 | Kim | G06V 10/82 |
| 10,402,695 B1* | 9/2019 | Kim | G06V 10/82 |
| 10,438,082 B1* | 10/2019 | Kim | G06N 20/00 |
| 2013/0121401 A1* | 5/2013 | Zheludkov | H04N 19/52 |
| | | | 375/240.02 |
| 2013/0279577 A1* | 10/2013 | Schwarz | H04N 19/52 |
| | | | 375/240.12 |
| 2013/0287116 A1* | 10/2013 | Helle | H04N 19/147 |
| | | | 375/240.24 |
| 2017/0013267 A1* | 1/2017 | Tanaka | H04N 19/463 |
| 2018/0165427 A1* | 6/2018 | Verthein | H04L 65/403 |
| 2018/0260956 A1* | 9/2018 | Huang | G06V 20/56 |
| 2019/0050667 A1* | 2/2019 | Wang | G06V 10/26 |
| 2019/0073553 A1* | 3/2019 | Yao | G06N 3/082 |
| 2019/0149821 A1* | 5/2019 | Moon | H04N 19/105 |
| | | | 375/240.02 |
| 2019/0273922 A1* | 9/2019 | Lim | H04N 19/176 |
| 2019/0281297 A1* | 9/2019 | Lee | H04N 19/157 |
| 2019/0342550 A1* | 11/2019 | Lim | H04N 19/176 |
| 2019/0355142 A1* | 11/2019 | Croxford | G06V 10/764 |
| 2019/0362180 A1* | 11/2019 | Croxford | G06F 16/51 |
| 2019/0364278 A1* | 11/2019 | Lee | H04N 19/174 |
| 2019/0385024 A1* | 12/2019 | Croxford | G06N 3/08 |
| 2019/0387226 A1* | 12/2019 | Lee | H04N 19/176 |
| 2020/0089985 A1* | 3/2020 | Wang | G06V 30/1463 |
| 2020/0092552 A1 | 3/2020 | Coelho et al. | |
| 2020/0092556 A1 | 3/2020 | Coelho et al. | |
| 2020/0221122 A1* | 7/2020 | Ye | H04N 19/176 |
| 2021/0027480 A1* | 1/2021 | Ren | G06N 3/084 |
| 2021/0089807 A1* | 3/2021 | Liu | G06V 10/774 |
| 2021/0314562 A1* | 10/2021 | Kang | H04N 19/593 |
| 2021/0392353 A1* | 12/2021 | Skupin | H04N 19/30 |
| 2021/0406582 A1* | 12/2021 | Wang | G06F 18/214 |
| 2022/0132103 A1* | 4/2022 | Li | H04N 19/105 |
| 2022/0368900 A1* | 11/2022 | Moon | H04N 19/107 |
| 2022/0408098 A1* | 12/2022 | Lin | H04N 19/176 |
| 2023/0095387 A1* | 3/2023 | Dumas | H04N 19/167 |
| | | | 375/240.26 |
| 2023/0096567 A1* | 3/2023 | Nalci | H04N 19/42 |
| | | | 375/240.03 |
| 2023/0254507 A1* | 8/2023 | Dumas | H04N 19/176 |
| | | | 375/240.12 |
| 2024/0031611 A1* | 1/2024 | Galpin | H04N 19/176 |
| 2024/0155153 A1* | 5/2024 | Kang | H04N 19/176 |

OTHER PUBLICATIONS

International Search Report dated Oct. 25, 2022 in Application No. PCT/US22/33816.
Written Opinion of the International Searching Authority dated Oct. 25, 2022 in Application No. PCT/US22/33816.
Japanese Office Action issued Mar. 5, 2024 in Application No. 2023-519443.

* cited by examiner

BLOCK-WISE ENTROPY CODING METHOD IN NEURAL IMAGE COMPRESSION

CROSS-REFERENCE TO RELATED APPLICATION

This application claims priority from U.S. Provisional Application No. 63/212,469, filed on Jun. 18, 2021, the disclosure of which is incorporated herein by reference in its entirety.

FIELD

Embodiments of the present disclosure are directed to block-wise entropy coding systems and methods in neural image compression.

BACKGROUND

In a deep neural network-based video or image coding framework, by utilizing a large amount of training dataset and sophisticated machining learning algorithms, different modules can be jointly optimized from input to output to improve a final objective (e.g., minimizing rate-distortion loss). In contrast, a traditional hybrid video codec usually focusses on optimizing a single module, which may not result in a coding gain in overall performance. Therefore, an end-to-end (E2E) optimized Neural Image Compression (NIC) is designed to optimize as a whole to achieve better coding performance.

Recently, ISO/IEC MPEG (JTC 1/SC 29/WG 11) has been actively searching for potential needs for standardization of future video coding technology. ISO/IEC JPEG has established JPEG-AI group focusing on AI-based end-to-end neural image compression. The Chinese AVS standard has also formed AVS-AI special group to work on neural image and video compression technologies. At the same time, many technology companies have also funded specialized research projects for NIC. The success of recent approaches has brought more and more industrial interests in advanced neural image and video compression methodologies.

The general framework of NIC is described as the following steps. Given an input image x, the target of NIC is to use the image as the input to a deep neural network (DNN) encoder to compute a compressed representation that is compact for storage and transmission. And then, the compressed representation will be quantized for arithmetic coding to generate a bitstream. The bitstream will be put back to arithmetic decoding which will be used as the input to a DNN decoder to reconstruct an image. Moreover, a hyperprior and context model can be used to further improve the compression performance.

During training of a model, a Rate-Distortion (R-D) loss is optimized to achieve trade-off between the distortion loss $D(x,\bar{x})$ of the reconstructed image and the bit consumption R of the compact representation $\hat{x}$ with a trade-off hyperparameter $\lambda$, as shown in Equation 1 below:

$$L(x,\bar{x},\hat{x})=\lambda D(x,\bar{x})+R(\hat{x}) \quad \text{(Equation 1)}$$

where x is an input image, $\bar{x}$ is a reconstructed image, and $\hat{x}$ is a compressed representation.

SUMMARY

Embodiments of the present disclosure provide a block-wise entropy coding method that optimizes a rate-distortion performance of image compression on an end-to-end (E2E) framework. The E2E optimized framework can be a DNN-based image or video coding framework that is well-pretrained for both encoder and decoder.

According to embodiments of the present disclosure, a method performed by at least one processor in a video encoder is provided. The method includes: receiving a bitstream that includes an image; partitioning the image into a plurality of blocks; compressing each of the plurality of blocks by a neural network-based encoder; obtaining compressed features by obtaining a compressed feature for each block from among the plurality of blocks in the image; processing the compressed features by an entropy encoder to generate a first compressed bitstream; obtaining a plurality of reshaped compressed features by concatenating the compressed features; processing the plurality of reshaped compressed features by the entropy encoder to generate a second compressed bitstream; and encoding the bitstream including the image based on the second compressed bitstream.

According to embodiments of the present disclosure, a system including at least one memory configured to store computer program code, and at least one processor configured to access the computer program code and operate as instructed by the computer program code is provided. The computer program code includes encoding code that is configured to cause the at least one processor to: partition an image, from a bitstream, into a plurality of blocks; compress each of the plurality of blocks by a neural network-based encoder; obtain compressed features by obtaining a compressed feature for each block from among the plurality of blocks in the image; process the compressed features by an entropy encoder to generate a first compressed bitstream; obtain a plurality of reshaped compressed features by concatenating the compressed features; process the plurality of reshaped compressed features by the entropy encoder to generate a second compressed bitstream; and encode the bitstream including the image based on the second compressed bitstream.

According to embodiments of the present disclosure, non-transitory computer-readable medium storing computer code that is configured to, when executed by at least one processor, cause the at least one processor to implement a video encoder that: receives a bitstream that includes an image; partitions the image into a plurality of blocks; compresses each of the plurality of blocks by a neural network-based encoder; obtains compressed features by obtaining a compressed feature for each block from among the plurality of blocks in the image; processes the compressed features by an entropy encoder to generate a first compressed bitstream; obtains a plurality of reshaped compressed features by concatenating the compressed features; processes the plurality of reshaped compressed features by the entropy encoder to generate a second compressed bitstream; and encodes the bitstream including the image based on the second compressed bitstream.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
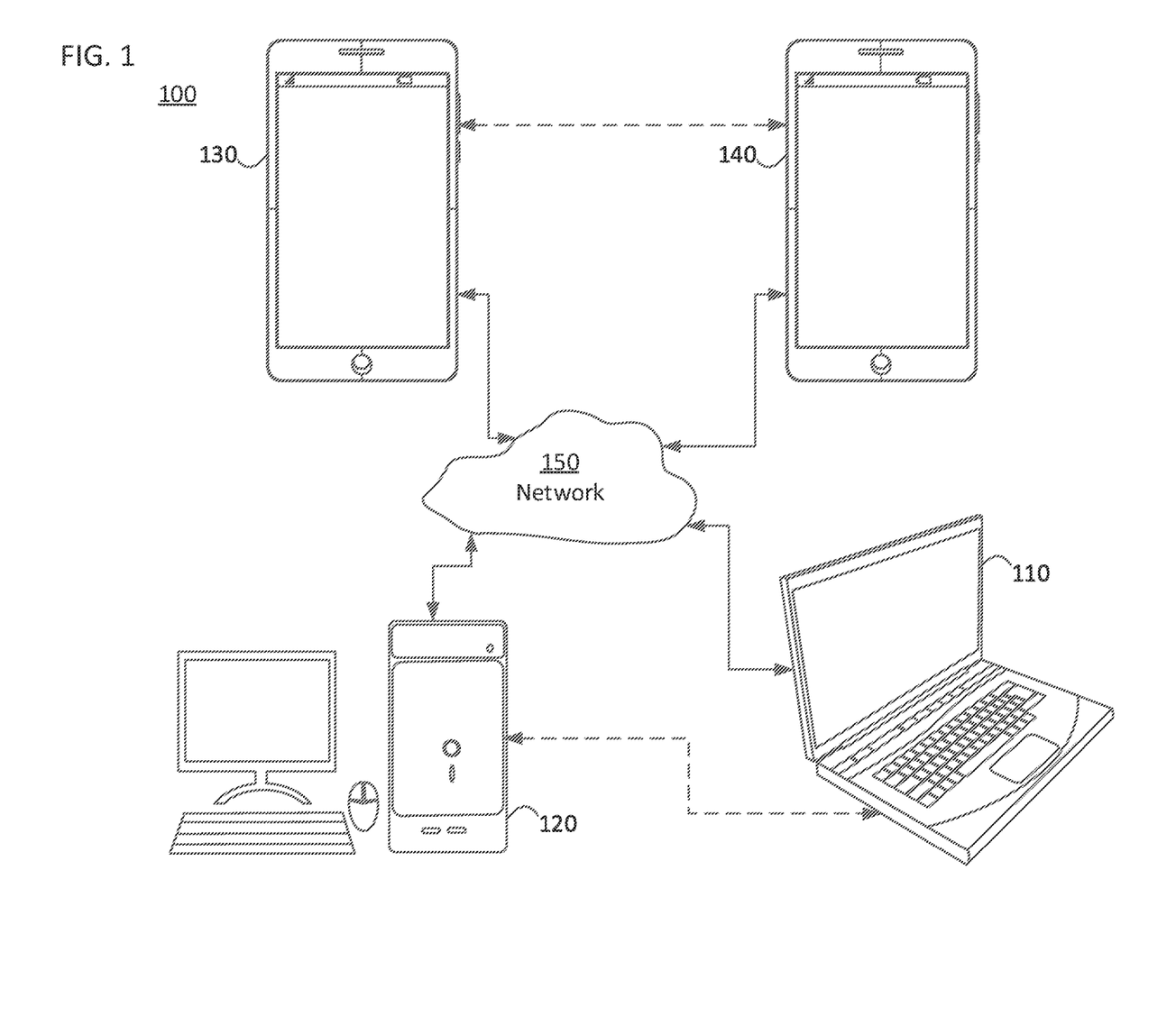
FIG. 1 is a schematic illustration of a simplified block diagram of a communication system in accordance with an embodiment.

FIG. 1 illustrates a simplified block diagram of a communication system 100 according to an embodiment of the present disclosure. The communication system 100 may include at least two terminals 110, 120 interconnected via a network 150. For unidirectional transmission of data, a first terminal 110 may code video data at a local location for transmission to the other terminal 120 via the network 150. The second terminal 120 may receive the coded video data of the other terminal from the network 150, decode the coded data and display the recovered video data. Unidirectional data transmission may be common in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data, and may display the recovered video data at a local display device.

In FIG. 1, the terminals 110-140 may be illustrated as servers, personal computers, and smart phones, and/or any other type of terminal. For example, the terminals 110-140 may be laptop computers, tablet computers, media players and/or dedicated video conferencing equipment. The network 150 represents any number of networks that convey coded video data among the terminals 110-140, including for example wireline and/or wireless communication networks. The communication network 150 may exchange data in circuit-switched and/or packet-switched channels. Representative networks include telecommunications networks, local area networks, wide area networks, and/or the Internet. For the purposes of the present discussion, the architecture and topology of the network 150 may be immaterial to the operation of the present disclosure unless explained herein below.

Figure 2:
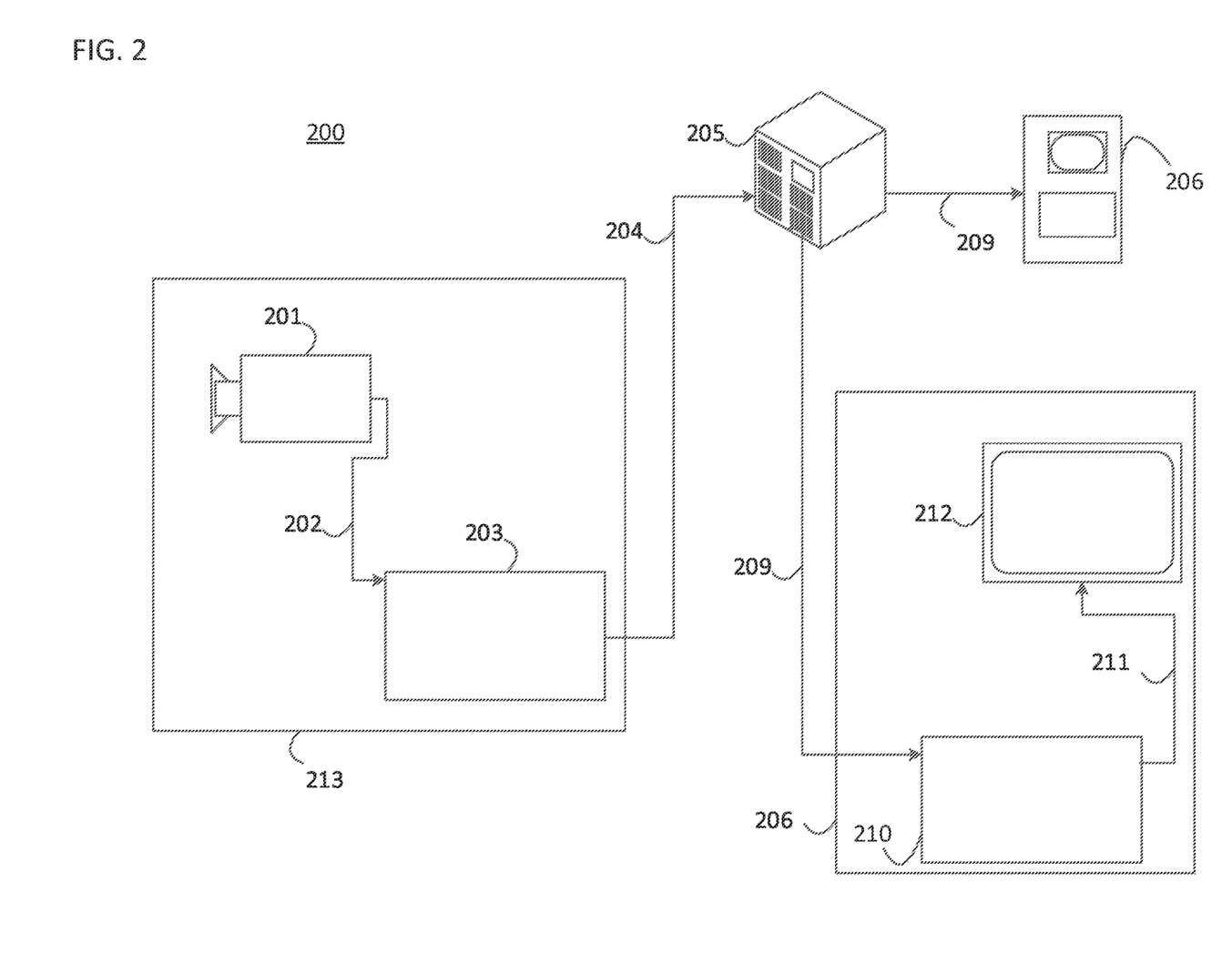
FIG. 2 is a schematic illustration of a simplified block diagram of a communication system in accordance with an embodiment.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

As illustrated in FIG. 2, a streaming system 200 may include a capture subsystem 213 that can include a video source 201 and an encoder 203. The video source 201 may be, for example, a digital camera, and may be configured to create an uncompressed video sample stream 202. The uncompressed video sample stream 202 may provide a high data volume when compared to encoded video bitstreams, and can be processed by the encoder 203 coupled to the video source 201. The encoder 203 can include hardware, software, or a combination thereof to enable or implement aspects of the disclosed subject matter as described in more detail below. The encoded video bitstream 204 may include a lower data volume when compared to the sample stream, and can be stored on a streaming server 205 for future use. One or more streaming clients 206 can access the streaming server 205 to retrieve video bitstreams 209 that may be copies of the encoded video bitstream 204.

In embodiments, the streaming server 205 may also function as a Media-Aware Network Element (MANE). For example, the streaming server 205 may be configured to prune the encoded video bitstream 204 for tailoring potentially different bitstreams to one or more of the streaming clients 206. In embodiments, a MANE may be separately provided from the streaming server 205 in the streaming system 200.

The streaming clients 206 can include a video decoder 210 and a display 212. The video decoder 210 can, for example, decode video bitstream 209, which is an incoming copy of the encoded video bitstream 204, and create an outgoing video sample stream 211 that can be rendered on the display 212 or another rendering device (not depicted). In some streaming systems, the video bitstreams 204, 209 can be encoded according to certain video coding/compression standards. Examples of such standards include, but are not limited to, ITU-T Recommendation H.265. Under development is a video coding standard informally known as Versatile Video Coding (VVC). Embodiments of the disclosure may be used in the context of VVC.

Figure 3:
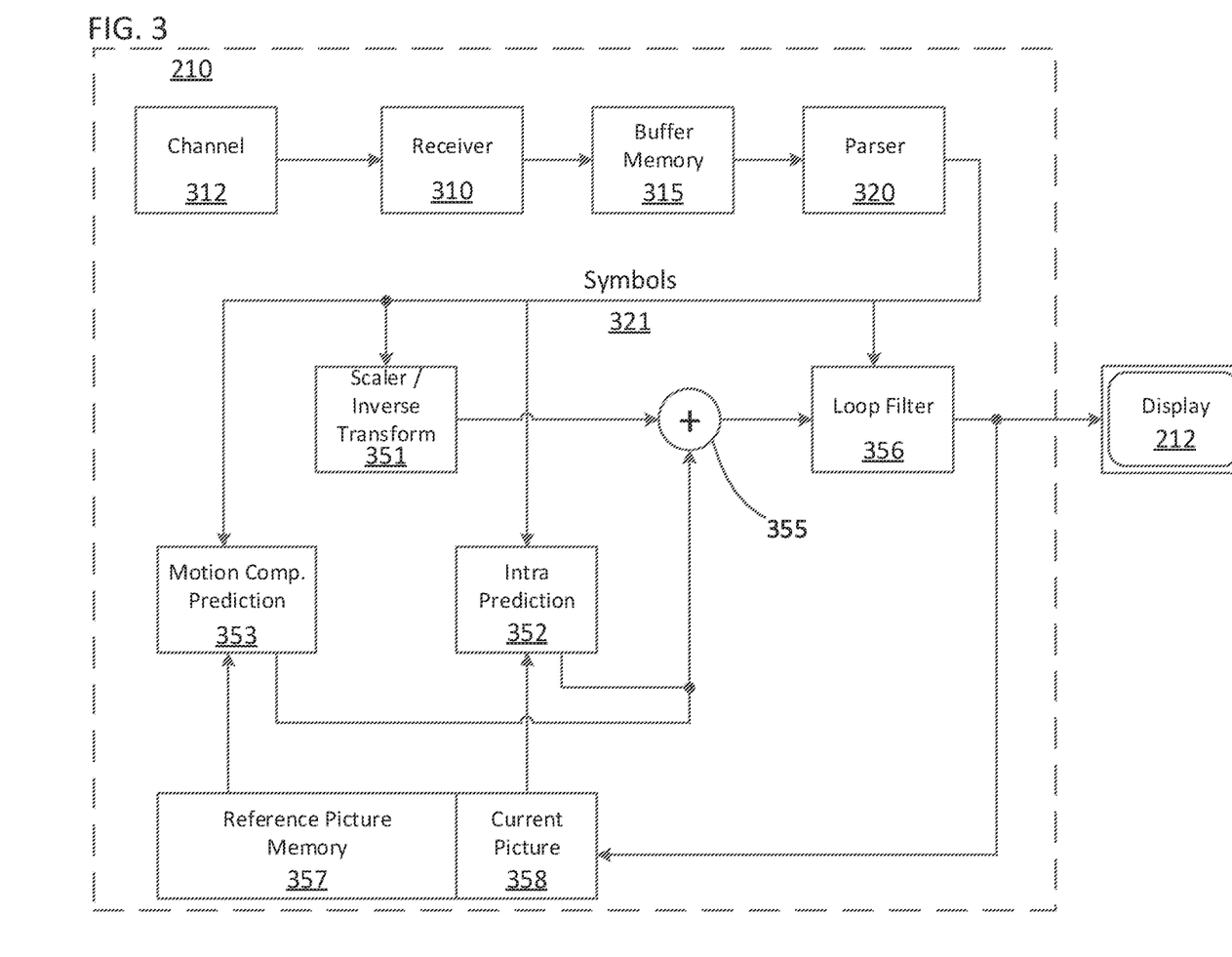
FIG. 3 is a schematic illustration of a simplified block diagram of a decoder in accordance with an embodiment.

FIG. 3 illustrates an example functional block diagram of a video decoder 210 that is attached to a display 212 according to an embodiment of the present disclosure.

The video decoder 210 may include a channel 312, receiver 310, a buffer memory 315, an entropy decoder/parser 320, a scaler/inverse transform unit 351, an intra picture prediction unit 352, a Motion Compensation Prediction unit 353, an aggregator 355, a loop filter unit 356, reference picture memory 357, and current picture memory. In at least one embodiment, the video decoder 210 may include an integrated circuit, a series of integrated circuits, and/or other electronic circuitry. The video decoder 210 may also be partially or entirely embodied in software running on one or more CPUs with associated memories.

In this embodiment, and other embodiments, the receiver 310 may receive one or more coded video sequences to be decoded by the decoder 210 one coded video sequence at a time, where the decoding of each coded video sequence is independent from other coded video sequences. The coded video sequence may be received from the channel 312, which may be a hardware/software link to a storage device which stores the encoded video data. The receiver 310 may receive the encoded video data with other data, for example, coded audio data and/or ancillary data streams, that may be forwarded to their respective using entities (not depicted). The receiver 310 may separate the coded video sequence from the other data. To combat network jitter, the buffer memory 315 may be coupled in between the receiver 310 and the entropy decoder/parser 320 ("parser" henceforth). When the receiver 310 is receiving data from a store/forward device of sufficient bandwidth and controllability, or from an isosynchronous network, the buffer memory 315 may not be used, or can be small. For use on best effort packet networks such as the Internet, the buffer memory 315 may be required, can be comparatively large, and can be of adaptive size.

The video decoder 210 may include a parser 320 to reconstruct symbols 321 from the entropy coded video sequence. Categories of those symbols include, for example, information used to manage operation of the decoder 210, and potentially information to control a rendering device such as a display 212 that may be coupled to a decoder as illustrated in FIG. 2. The control information for the rendering device(s) may be in the form of, for example, Supplementary Enhancement Information (SEI) messages or Video Usability Information (VUI) parameter set fragments (not depicted). The parser 320 may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser 320 may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 320 may also extract from the coded video sequence information such as transform coefficients, quantizer parameter values, motion vectors, and so forth.

The parser 320 may perform entropy decoding/parsing operation on the video sequence received from the buffer memory 315, so to create symbols 321.

Reconstruction of the symbols 321 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 320. The flow of such subgroup control information between the parser 320 and the multiple units below is not depicted for clarity.

Beyond the functional blocks already mentioned, decoder 210 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

One unit may be the scaler/inverse transform unit 351. The scaler/inverse transform unit 351 may receive quantized transform coefficient as well as control information, including which transform to use, block size, quantization factor, quantization scaling matrices, etc. as symbol(s) 321 from the parser 320. The scaler/inverse transform unit 351 can output blocks including sample values that can be input into the aggregator 355.

In some cases, the output samples of the scaler/inverse transform unit 351 can pertain to an intra coded block; that is: a block that is not using predictive information from previously reconstructed pictures, but can use predictive information from previously reconstructed parts of the current picture. Such predictive information can be provided by an intra picture prediction unit 352. In some cases, the intra picture prediction unit 352 generates a block of the same size and shape of the block under reconstruction, using surrounding already reconstructed information fetched from the current (partly reconstructed) picture from the current picture memory 358. The aggregator 355, in some cases, adds, on a per sample basis, the prediction information the intra picture prediction unit 352 has generated to the output sample information as provided by the scaler/inverse transform unit 351.

In other cases, the output samples of the scaler/inverse transform unit 351 can pertain to an inter coded, and potentially motion compensated block. In such a case, a Motion Compensation Prediction unit 353 can access reference picture memory 357 to fetch samples used for prediction. After motion compensating the fetched samples in accordance with the symbols 321 pertaining to the block, these samples can be added by the aggregator 355 to the output of the scaler/inverse transform unit 351 (in this case called the residual samples or residual signal) so to generate output sample information. The addresses within the reference picture memory 357, from which the Motion Compensation Prediction unit 353 fetches prediction samples, can be controlled by motion vectors. The motion vectors may be available to the Motion Compensation Prediction unit 353 in the form of symbols 321 that can have, for example, X, Y, and reference picture components. Motion compensation also can include interpolation of sample values as fetched from the reference picture memory 357 when sub-sample exact motion vectors are in use, motion vector prediction mechanisms, and so forth.

The output samples of the aggregator 355 can be subject to various loop filtering techniques in the loop filter unit 356. Video compression technologies can include in-loop filter technologies that are controlled by parameters included in the coded video bitstream and made available to the loop filter unit 356 as symbols 321 from the parser 320, but can also be responsive to meta-information obtained during the decoding of previous (in decoding order) parts of the coded picture or coded video sequence, as well as responsive to previously reconstructed and loop-filtered sample values.

The output of the loop filter unit 356 can be a sample stream that can be output to a render device such as a display 212, as well as stored in the reference picture memory 357 for use in future inter-picture prediction.

Certain coded pictures, once fully reconstructed, can be used as reference pictures for future prediction. Once a coded picture is fully reconstructed and the coded picture has been identified as a reference picture (by, for example, parser 320), the current reference picture can become part of the reference picture memory 357, and a fresh current picture memory can be reallocated before commencing the reconstruction of the following coded picture.

The video decoder 210 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver 310 may receive additional (redundant) data with the encoded video. The additional data may be included as part of the coded video sequence(s). The additional data may be used by the video decoder 210 to properly decode the data and/or to more accurately reconstruct the original video data. Additional data can be in the form of, for example, temporal, spatial, or SNR enhancement layers, redundant slices, redundant pictures, forward error correction codes, and so on.

Figure 4:
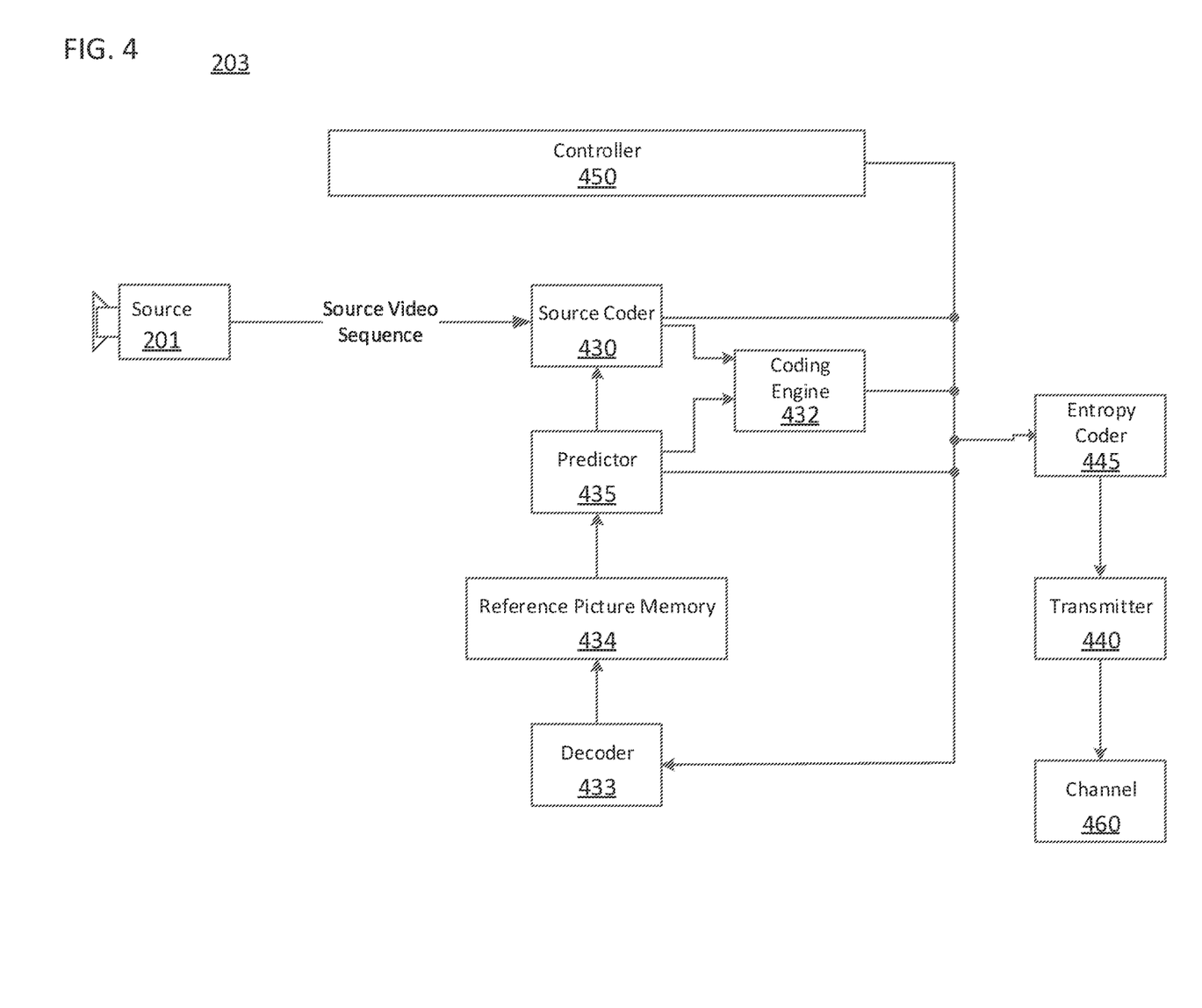
FIG. 4 is a schematic illustration of a simplified block diagram of an encoder in accordance with an embodiment.

FIG. 4 illustrates an example functional block diagram of a video encoder 203 associated with a video source 201 according to an embodiment of the present disclosure.

The video encoder 203 may include, for example, an encoder that is a source coder 430, a coding engine 432, a (local) decoder 433, a reference picture memory 43, a predictor 435, a transmitter 440, an entropy coder 445, a controller 450, and a channel 460.

The encoder 203 may receive video samples from a video source 201 (that is not part of the encoder) that may capture video image(s) to be coded by the encoder 203.

The video source 201 may provide the source video sequence to be coded by the encoder 203 in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source 201 may be a storage device storing previously prepared video. In a videoconferencing system, the video source 201 may be a camera that captures local image information as a video sequence. Video data may be provided as a plurality of individual pictures that impart motion when viewed in sequence. The pictures themselves may be organized as a spatial array of pixels, wherein each pixel can include one or more sample depending on the sampling structure, color space, etc. in use. A person skilled in the art can readily understand the relationship between pixels and samples. The description below focuses on samples.

According to an embodiment, the encoder 203 may code and compress the pictures of the source video sequence into a coded video sequence 443 in real time or under any other time constraints as required by the application. Enforcing appropriate coding speed is one function of controller 450. The controller 450 may also control other functional units as described below and may be functionally coupled to these units. The coupling is not depicted for clarity. Parameters set by the controller 450 can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller 450 as they may pertain to video encoder 203 optimized for a certain system design.

Some video encoders operate in what a person skilled in the are readily recognizes as a "coding loop". As an oversimplified description, a coding loop can consist of the encoding part of the source coder 430 (responsible for creating symbols based on an input picture to be coded, and a reference picture(s)), and the (local) decoder 433 embedded in the encoder 203 that reconstructs the symbols to create the sample data that a (remote) decoder also would create when a compression between symbols and coded video bitstream is lossless in certain video compression technologies. That reconstructed sample stream may be input to the reference picture memory 434. As the decoding of a symbol stream leads to bit-exact results independent of decoder location (local or remote), the reference picture memory content is also bit exact between a local encoder and a remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is known to a person skilled in the art.

The operation of the "local" decoder 433 can be the same as of a "remote" decoder 210, which has already been described in detail above in conjunction with FIG. 3. However, as symbols are available and en/decoding of symbols to a coded video sequence by the entropy coder 445 and the parser 320 can be lossless, the entropy decoding parts of decoder 210, including channel 312, receiver 310, buffer memory 315, and parser 320 may not be fully implemented in the local decoder 433.

An observation that can be made at this point is that any decoder technology, except the parsing/entropy decoding that is present in a decoder, may need to be present, in substantially identical functional form in a corresponding encoder. For this reason, the disclosed subject matter focuses on decoder operation. The description of encoder technologies can be abbreviated as they may be the inverse of the comprehensively described decoder technologies. Only in certain areas a more detail description is required and provided below.

As part of its operation, the source coder 430 may perform motion compensated predictive coding, which codes an input frame predictively with reference to one or more previously-coded frames from the video sequence that were designated as "reference frames." In this manner, the coding engine 432 codes differences between pixel blocks of an input frame and pixel blocks of reference frame(s) that may be selected as prediction reference(s) to the input frame.

The local decoder 433 may decode coded video data of frames that may be designated as reference frames, based on symbols created by the source coder 430. Operations of the coding engine 432 may advantageously be lossy processes. When the coded video data may be decoded at a video decoder (not shown in FIG. 4), the reconstructed video sequence typically may be a replica of the source video sequence with some errors. The local decoder 433 replicates decoding processes that may be performed by the video decoder on reference frames and may cause reconstructed reference frames to be stored in the reference picture memory 434. In this manner, the encoder 203 may store copies of reconstructed reference frames locally that have common content as the reconstructed reference frames that will be obtained by a far-end video decoder (absent transmission errors).

The predictor 435 may perform prediction searches for the coding engine 432. That is, for a new frame to be coded, the predictor 435 may search the reference picture memory 434 for sample data (as candidate reference pixel blocks) or certain metadata such as reference picture motion vectors, block shapes, and so on, that may serve as an appropriate prediction reference for the new pictures. The predictor 435 may operate on a sample block-by-pixel block basis to find appropriate prediction references. In some cases, as determined by search results obtained by the predictor 435, an input picture may have prediction references drawn from multiple reference pictures stored in the reference picture memory 434.

The controller 450 may manage coding operations of the source coder 430, including, for example, setting of parameters and subgroup parameters used for encoding the video data.

Output of all aforementioned functional units may be subjected to entropy coding in the entropy coder 445. The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter 440 may buffer the coded video sequence(s) as created by the entropy coder 445 to prepare it for transmission via a communication channel 460, which may be a hardware/software link to a storage device which would store the encoded video data. The transmitter 440 may merge coded video data from the source coder 430 with other data to be transmitted, for example, coded audio data and/or ancillary data streams (sources not shown).

The controller 450 may manage operation of the encoder 203. During coding, the controller 450 may assign to each coded picture a certain coded picture type, which may affect the coding techniques that may be applied to the respective picture. For example, pictures often may be assigned as an Intra Picture (I picture), a Predictive Picture (P picture), or a Bi-directionally Predictive Picture (B Picture).

An Intra Picture (I picture) may be one that may be coded and decoded without using any other frame in the sequence as a source of prediction. Some video codecs allow for different types of Intra pictures, including, for example Independent Decoder Refresh (IDR) Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video encoder 203 may perform coding operations according to a predetermined video coding technology or standard, such as ITU-T Rec. H.265. In its operation, the video encoder 203 may perform various compression operations, including predictive coding operations that exploit temporal and spatial redundancies in the input video sequence. The coded video data, therefore, may conform to a syntax specified by the video coding technology or standard being used.

In an embodiment, the transmitter 440 may transmit additional data with the encoded video. The source coder 430 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

According to embodiments of the present disclosure, block-wise entropy coding methods in NIC for improving coding efficiency are provided.

For example, with reference to FIGS. 5-6, example methods of the present disclosure are described below.

Figure 5:
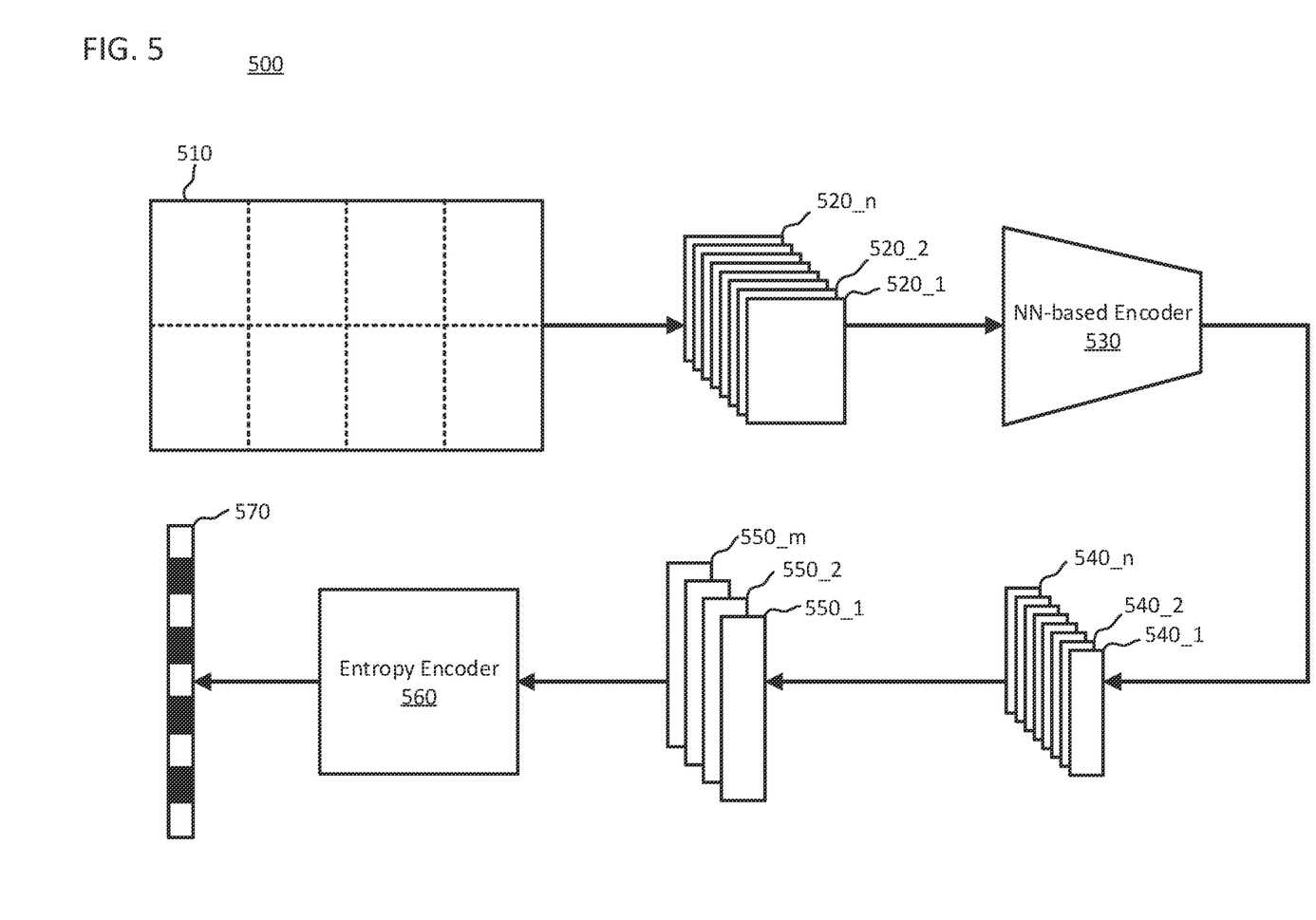
FIG. 5 illustrates an NIC encoding method according to embodiments of the present disclosure that may be performed by an encoder.

FIG. 5 illustrates an NIC encoding method according to embodiments of the present disclosure that may be performed by an encoder of the present disclosure.

With reference to FIG. 5, of each input image 510 to be compressed, the input image 510 can be partitioned into smaller blocks 520_1, 520_2, . . . , 520_n. For example, the input image 510 may be divided into eight blocks 520_1, 520_2, . . . , 520_n as shown in FIG. 5. Because hardware may have a memory limit, it is reasonable to split high resolution images into small blocks for parallel processing.

Each of the blocks 520_1, 520_2, . . . , 520_n may be compressed by a NN-based encoder 530 to obtain compressed features 540_1, 540_2, . . . , 540_n. For example, blocks 520_1, 520_2, . . . , 520_n may be compressed to obtain compressed features 540_1, 540_2, . . . , 540_n, respectively. As shown in FIG. 5, the blocks 520_1, 520_2, . . . , 520_n are processed by the NN-based encoder 530 so that eight compressed features 540_1, 540_2, . . . , 540_n correspond to the eight blocks 520_1, 520_2, . . . , 520_n, respectively. According to embodiments, the compressed features 540_1, 540_2, . . . , 540_n may be compressed feature blocks.

Each compressed feature 540_1, 540_2, . . . , 540_n may be processed by an entropy encoder 560 to generate a compressed bitstream 570. According to embodiments of the present disclosure, before entropy encoding, all or some of the compressed features 540_1, 540_2, . . . , 540_n can be transformed (e.g., concatenated together) to get reshaped compressed features 550_1, 550_2, . . . , 550_m, wherein "m" may be less than "n". In other words, the total number of reshaped compressed features 550_1, 550_2, . . . , 550_m may be smaller than the total number of compressed feature 540_1, 540_2, . . . , 540_n. As shown in FIG. 5, to achieve better compression performance for entropy coder, the eight compressed features 540_1, 540_2, . . . , 540_n are transformed into four reshaped compressed features 550_1, 550_2, . . . , 550_m. According to embodiments, the transformation can be concatenation, upsampling, or an NN-based method. According to embodiments, the reshaped compressed features 550_1, 550_2, . . . , 550_m may be reshaped compressed feature blocks. According to embodiments, the reshaped compressed feature blocks may have a larger size than the compressed feature block(s) from which they were obtained.

Following the transformation, the reshaped compressed features 550_1, 550_2, ..., 550_m may be processed by the entropy encoder 560 to generate the compressed bitstream 570, which may be sent to, for example, a decoder.

Figure 6:
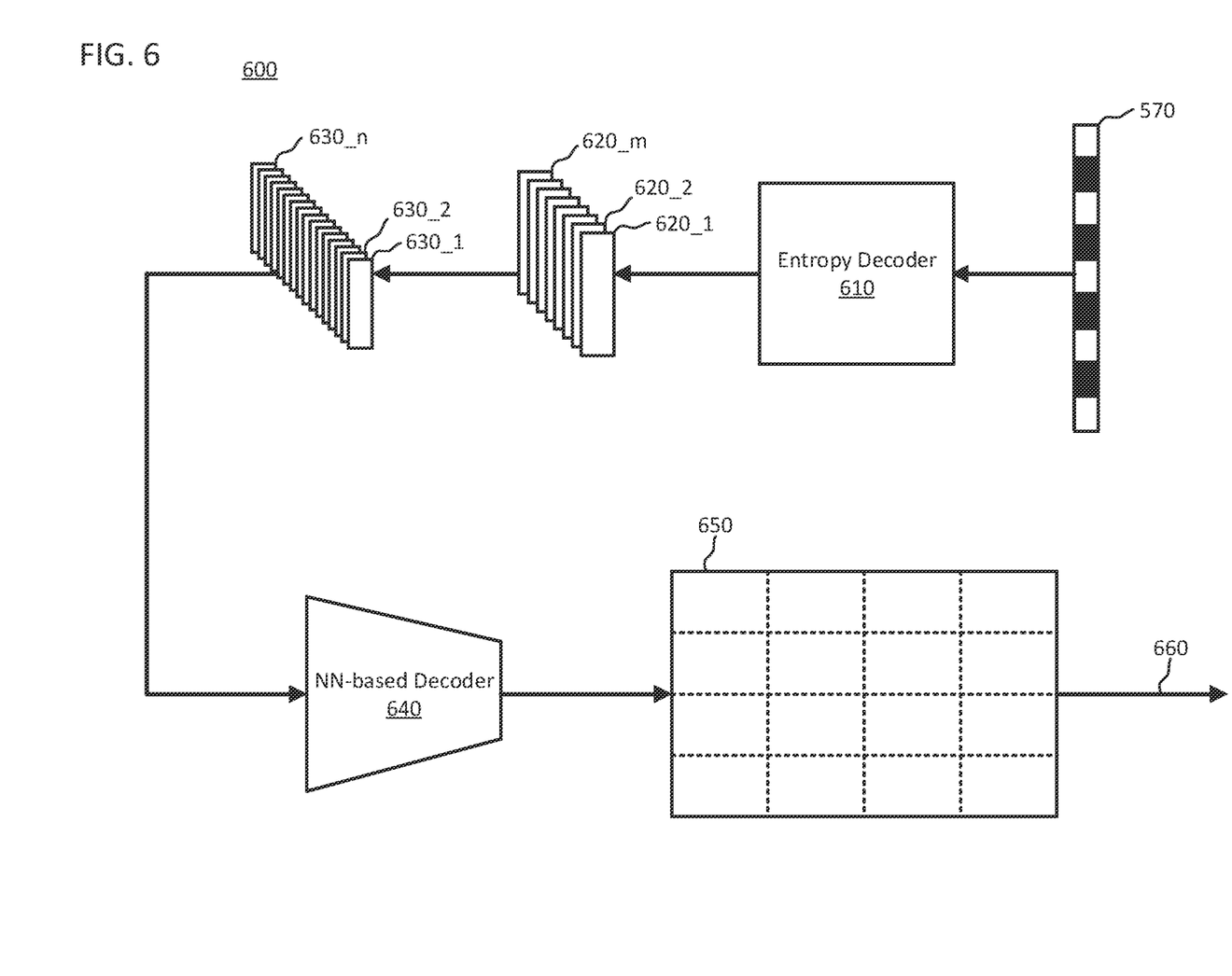
FIG. 6 illustrates an NIC decoding method 600 according to embodiments of the present disclosure that may be performed by a decoder.

FIG. 6 illustrates an NIC decoding method 600 according to embodiments of the present disclosure that may be performed by a decoder of the present disclosure.

With reference to FIG. 6, the compressed bitstream 570 is processed by an entropy decoder 610 to generate decompressed features 620_1, 620_2, ..., 620_m. According to embodiments, the decompressed features 620_1, 620_2, ..., 620_m may be decompressed feature blocks.

The decompressed features 620_1, 620_2, ..., 620_m can be transformed (e.g., divided) into reshaped decompressed features 630_1, 630_2, ..., 630_n, wherein "n" is greater than "m". In other words, the total number of decompressed features 620_1, 620_2, ..., 620_m may be less than the total number of reshaped decompressed features 630_1, 630_2, ..., 630_n. According to embodiments, the reshaped decompressed features 630_1, 630_2, ..., 630_n may be reshaped decompressed feature blocks. According to embodiments, the reshaped decompressed feature blocks may have a smaller size than the decompressed feature block(s) from which they were obtained.

According to embodiments, the total number of decompressed features 620_1, 620_2, ..., 620_m may be the same as the total number of reshaped compressed features 550_1, 550_2, ..., 550_m, and the total number of reshaped decompressed feature 630_1, 630_2, ..., 630_n may be the same as the total number of compressed features 540_1, 540_2, ..., 540_n. However, embodiments are not limited thereto, and the total numbers may be different as, for example, shown in FIGS. 5-6. For example, as a non-limiting example embodiment, there may be eight compressed feature 540_1, 540_2, ..., 540_n; four reshaped compressed features 550_1, 550_2, ..., 550_m; eight decompressed features 620_1, 620_2, ..., 620_m; and 16 reshaped decompressed features 630_1, 630_2, ..., 630_n.

After obtaining the reshaped decompressed features 630_1, 630_2, ..., 630_n, the reshaped decompressed features 630_1, 630_2, ..., 630_n may be decoded by an NN-based decoder 640 to obtain a reconstructed block 650. According to embodiments, the reconstructed block 650 may be a reconstructed picture. The whole reconstructed picture can be further processed by post enhancement 660 to improve visual quality of the reconstructed picture. For example, the post enhancement 660 may include deblocking and/or noise reduction. According to embodiments, the reconstructed picture may then be displayed on a display.

In a traditional NIC framework, an NN-based entropy coder only encodes a single block of a compressed feature at one time, and the entropy model's scale and variance are only evaluated on block-by-block way. According to embodiments of the present disclosure, multiple blocks are processed by an NN-based encoder, and then combined together for entropy coding.

In one embodiment of the present disclosure, during the training of models utilized by an NN-based encoder and an NN-based decoder of the present disclosure, the encoder and decoder can be trained jointly or separately. The transformation operation between compressed features and reshaped features can be also added to the bitstream, and this information can be treated as a signal to decoder that performs the decoding process. For example, according to embodiments of the present disclosure, the encoder that performs the encoding process illustrated in FIG. 5 may send, within the encoded bitstream, an indicator (e.g., a syntax element) of the transformation operation, used by the encoder, to the decoder that performs the decoding process illustrated in FIG. 6. The decoder may obtain the indicator and transform the decompressed features into the reshaped decompressed features based on the transformation signalled by the indicator. For example, the decoder may use an inverse transformation corresponding to the transformation used by the encoder.

According to embodiments, the shape of compressed feature blocks, reshaped compressed feature blocks, decompressed feature blocks, and/or reshaped decompressed feature blocks can be square or rectangular. Each block from among a single type of blocks (e.g., the compressed feature blocks or the decompressed feature blocks) can be the same shape and/or size as each other or may have a different shape and/or size from at least one other block from among the single type of blocks. According to embodiments, a single type of blocks (e.g., the compressed feature blocks or the decompressed feature blocks) may be transformed (e.g., divided or combined) into different sizes.

According to embodiments, at least one processor and memory storing computer program instructions may be provided. The computer program instructions, when executed by the at least one processor, may implement an encoder or a decoder and may perform any number of the functions described in the present disclosure. For example, with reference to FIG. 7, the at least one processor may implement an encoder 700. The encoder 700 may be an NIC encoder. The computer program instructions may include, for example, encoding code 710 that is configured to cause the at least one processor to code at least one picture that is received, and sending code 760 that is configured to cause the at least one processor to send a bitstream obtained from coding the at least one picture to, for example, a decoder. The encoding code 710 may include, for example, dividing code 720, first obtaining code 730, second obtaining code 740, and third obtaining code 750.

Figure 7:
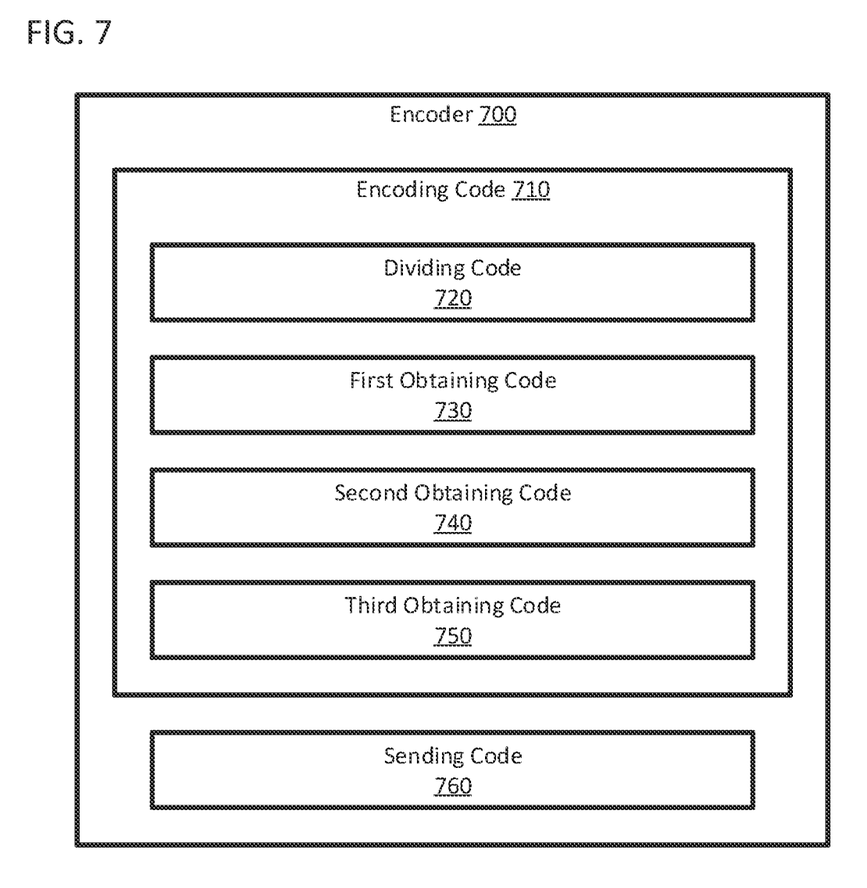
FIG. 7 is a block diagram of computer code according to embodiments.

The dividing code 720 may be configured to cause the at least one processor to divide an image into a plurality of blocks, according to embodiments of the present disclosure.

The first obtaining code 730 may be configured to cause the at least one processor to obtain compressed features by encoding the plurality of blocks, according to embodiments of the present disclosure. According to embodiments, compressed feature blocks are obtained. According to embodiments, the plurality of blocks are encoded using a neural network by using an NN-based encoder.

The second obtaining code 740 may be configured to cause the at least one processor to obtain reshaped compressed features by transforming the compressed features, a total number of the reshaped compressed features being less than a total number of the compressed features, according to embodiments of the present disclosure. According to embodiments, reshaped compressed feature blocks are obtained, and the transforming the compressed features comprises transforming the compressed feature blocks into reshaped compressed feature blocks that are larger than the compressed feature blocks. According to embodiments, the transforming comprises concatentation, upsampling, or an NN-based method.

The third obtaining code 750 may be configured to cause the at least one processor to obtain the bitstream that includes an encoded image by entropy encoding the reshaped compressed features, according to embodiments of the present disclosure. According to embodiments, the third obtaining code 750 may be further configured to cause the at least one processor to include, within the bitstream, an indicator (e.g., a syntax element) that indicates the transformation operation used by the encoder 700.

According to embodiments, the compressed feature blocks or the reshaped compressed feature blocks each have a square shape or a rectangular shape. According to embodiments, the reshaped compressed feature blocks are a same shape as each other. According to embodiments, at least two of the reshaped compressed feature blocks have a different shape from each other. According to embodiments, the reshaped compressed feature blocks are a same size as each other. According to embodiments, at least two of the reshaped compressed feature blocks are a different size from each other.

According to embodiments, the decoder-side processes corresponding to the above processes may be implemented by decoding code for decoding a picture as would be understood by a person of ordinary skill in the art, based on the above descriptions.

Figure 8:
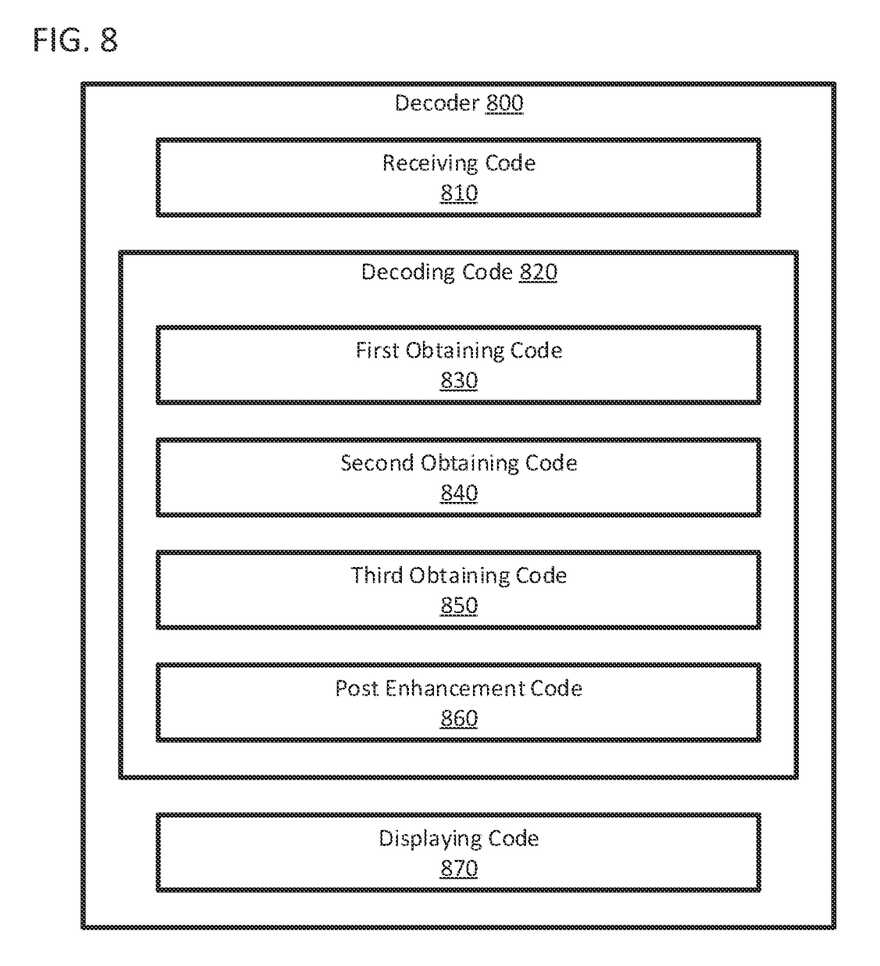
FIG. 8 is a block diagram of computer code according to embodiments.

For example, with reference to FIG. 8, at least one processor may implement a decoder 800. The decoder 800 may be an NIC decoder. Computer program instructions stored in memory of the decoder 800 may include, for example, receiving code 810, decoding code 820, and displaying code 870.

The receiving code 810 may be configured to cause the at least one processor to receive a bitstream that includes at least one encoded image.

The decoding code 820 may be configured to cause the at least one processor to decode the at least one encoded image that is received. According to embodiments, the decoding code 820 may include, for example, first obtaining code 830, second obtaining code 840, third obtaining code 850, and post enhancement code 860.

The first obtaining code 830 may be configured to cause the at least one processor to obtain decompressed features of the encoded image by entropy decoding the bitstream. According to embodiments, decompressed feature blocks are obtained.

The second obtaining code 840 may be configured to cause the at least one processor to obtain reshaped decompressed features by transforming the decompressed features, a total number of the reshaped decompressed features being greater than a total number of the decompressed features. According to embodiments, reshaped decompressed feature blocks are obtained, and the transforming the decompressed features comprises transforming the decompressed feature blocks into reshaped decompressed feature blocks that are smaller than the compressed feature blocks. According to embodiments, the transforming comprises dividing the decompressed feature blocks into the reshaped decompressed feature blocks. According to embodiments, the second obtaining code 840 may be further configured to cause the at least one processor to obtain the indicator included in the bitstream, and transform the decompressed features into the reshaped decompressed features based on the transformation signalled by the indicator.

The third obtaining code 850 may be configured to cause the at least one processor to obtain a reconstructed image by decoding the reshaped decompressed features. According to embodiments, the reshaped decompressed features are decoded using a neural network by using an NN-based decoder.

The post enhancement code 860 may be configured to cause the at least one processor to perform a post enhancement on the reconstructed image. The post enhancement may include, for example, deblocking and/or noise reduction.

The displaying code 870 may be configured to cause the at least one processor to control a display to display the reconstructed image, after the post enhancement is performed.

According to embodiments, the decompressed feature blocks or the reshaped decompressed feature blocks each have a square shape or a rectangular shape. According to embodiments, the reshaped decompressed feature blocks are a same shape as each other. According to embodiments, at least two of the reshaped decompressed feature blocks have a different shape from each other. According to embodiments, the reshaped decompressed feature blocks are a same size as each other. According to embodiments, at least two of the reshaped decompressed feature blocks are a different size from each other Embodiments of the present disclosure improve upon prior E2E image compression methods.

For example, embodiments of the present disclosure include the aspect of splitting and transforming blocks at encoder side and decoder side, which improves processing speed for the encoder side with reasonable compression performance and reduces the memory burden for the decoder side.

Also, embodiments of the present disclosure provide a flexible and general framework that accommodates various types of quality metrics.

The techniques of embodiments of the present disclosure described above, can be implemented as computer software using computer-readable instructions and physically stored in one or more computer-readable media. For example, FIG. 9 shows a computer system 900 suitable for implementing embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 9:
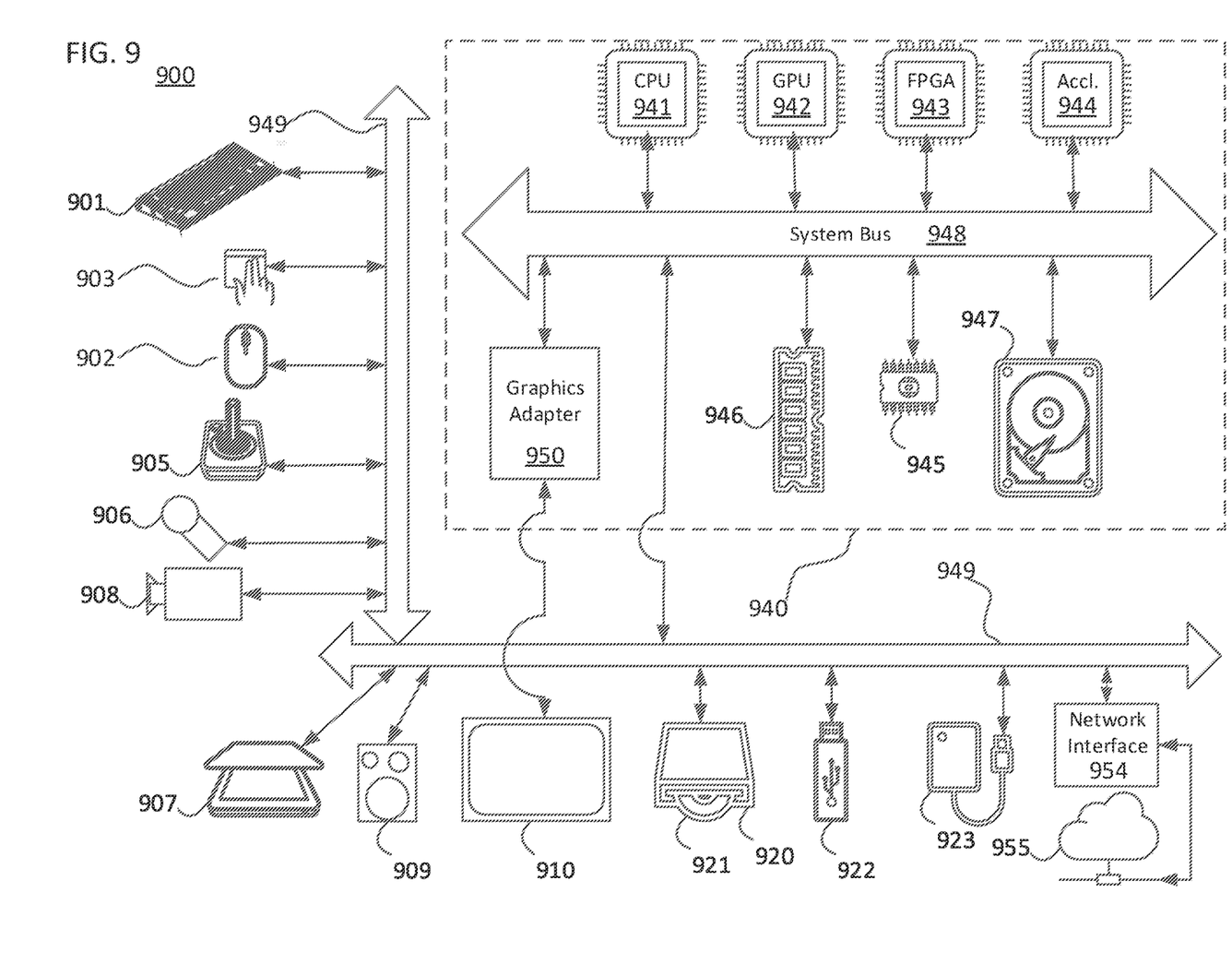
FIG. 9 is a diagram of a computer system suitable for implementing embodiments of the present disclosure.

The components shown in FIG. 9 for computer system 900 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 900.

Computer system 900 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 901, mouse 902, trackpad 903, touch screen 910, data-glove, joystick 905, microphone 906, scanner 907, and camera 908.

Computer system 900 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 910, data-glove, or joystick 905, but there can also be tactile feedback devices that do not serve as input devices). For example, such devices may be audio output devices (such as: speakers 909, headphones (not depicted)), visual output devices (such as screens 910 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 900 can also include human accessible storage devices and their associated media such as optical media including CD/DVD ROM/RW 920 with CD/DVD or the like media 921, thumb-drive 922, removable hard drive or solid state drive 923, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 900 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 949 (such as, for example USB ports of the computer system 900; others are commonly integrated into the core of the computer system 900 by attachment to a system bus as described below (for example Ethernet interface into a PC computer system or cellular network interface into a smartphone computer system). Using any of these networks, computer system 900 can communicate with other entities. Such communication can be uni-directional, receive only (for example, broadcast TV), uni-directional send-only (for example CANbus to certain CANbus devices), or bi-directional, for example to other computer systems using local or wide area digital networks. Such communication can include communication to a cloud computing environment 955. Certain protocols and protocol stacks can be used on each of those networks and network interfaces as described above.

Aforementioned human interface devices, human-accessible storage devices, and network interfaces 954 can be attached to a core 940 of the computer system 900.

The core 940 can include one or more Central Processing Units (CPU) 941, Graphics Processing Units (GPU) 942, specialized programmable processing units in the form of Field Programmable Gate Areas (FPGA) 943, hardware accelerators 944 for certain tasks, and so forth. These devices, along with Read-only memory (ROM) 945, Random-access memory 946, internal mass storage such as internal non-user accessible hard drives, SSDs, and the like 947, may be connected through a system bus 948. In some computer systems, the system bus 948 can be accessible in the form of one or more physical plugs to enable extensions by additional CPUs, GPU, and the like. The peripheral devices can be attached either directly to the core's system bus 948, or through a peripheral bus 949. Architectures for a peripheral bus include PCI, USB, and the like. A graphics adapter 950 may be included in the core 940.

CPUs 941, GPUs 942, FPGAs 943, and accelerators 944 can execute certain instructions that, in combination, can make up the aforementioned computer code. That computer code can be stored in ROM 945 or RAM 946. Transitional data can be also be stored in RAM 946, whereas permanent data can be stored for example, in the internal mass storage 947. Fast storage and retrieve to any of the memory devices can be enabled through the use of cache memory, that can be closely associated with one or more CPU 941, GPU 942, mass storage 947, ROM 945, RAM 946, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system 900 having architecture, and specifically the core 940 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 940 that are of non-transitory nature, such as core-internal mass storage 947 or ROM 945. The software implementing various embodiments of the present disclosure can be stored in such devices and executed by core 940. A computer-readable medium can include one or more memory devices or chips, according to particular needs. The software can cause the core 940 and specifically the processors therein (including CPU, GPU, FPGA, and the like) to execute particular processes or particular parts of particular processes described herein, including defining data structures stored in RAM 946 and modifying such data structures according to the processes defined by the software. In addition or as an alternative, the computer system can provide functionality as a result of logic hardwired or otherwise embodied in a circuit (for example: accelerator 944), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several non-limiting example embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method performed by at least one processor in a video encoder, the method comprising:
    receiving a bitstream that includes an image;
    partitioning the image into a plurality of blocks;
    compressing each of the plurality of blocks by a neural network-based encoder;
    obtaining compressed features by obtaining a compressed feature for each block from among the plurality of blocks in the image;
    processing the compressed features by an entropy encoder to generate a first compressed bitstream;
    obtaining a plurality of reshaped compressed features by concatenating the compressed features such that a number of reshaped compressed features is less than a number of compressed features, wherein the concatenating the compressed features comprises concatenating the compressed feature blocks into reshaped compressed feature blocks that are larger than the compressed feature blocks, wherein a first reshaped compressed feature block has a square shape and a second reshaped feature block has a rectangular shape, wherein at least two of the reshaped compressed feature blocks are a different size from each other;
    processing the plurality of reshaped compressed features by the entropy encoder to generate a second compressed bitstream; and
    encoding the bitstream including the image based on the second compressed bitstream.

2. The method according to claim 1, wherein
    the obtaining the compressed features comprises obtaining compressed feature blocks; and.

3. The method according to claim 1, wherein the encoding the bitstream comprises including an indicator in the encoded bitstream that indicates that the compressed features were concatenated.

4. The method according to claim 1, further comprises sending the encoded bitstream to a decoder.

5. A system comprising:
    at least one memory configured to store computer program code; and
    at least one processor configured to access the computer program code and operate as instructed by the computer program code, the computer program code comprising encoding code that is configured to cause the at least one processor to:
        partition an image, from a bitstream, into a plurality of blocks;
        compress each of the plurality of blocks by a neural network-based encoder;
        obtain compressed features by obtaining a compressed feature for each block from among the plurality of blocks in the image;
        process the compressed features by an entropy encoder to generate a first compressed bitstream;
        obtain a plurality of reshaped compressed features by concatenating the compressed features such that a number of reshaped compressed features is less than a number of compressed features, wherein the concatenating the compressed features comprises concatenating the compressed feature blocks into reshaped compressed feature blocks that are larger than the compressed feature blocks, wherein a first reshaped compressed feature block has a square shape and a second reshaped feature block has a rectangular shape, wherein at least two of the reshaped compressed feature blocks are a different size from each other;
        process the plurality of reshaped compressed features by the entropy encoder to generate a second compressed bitstream; and
        encode the bitstream including the image based on the second compressed bitstream.

6. The system according to claim 5, wherein
    the compressed features are compressed feature blocks.

7. The system according to claim 5, wherein the encoding code is configured to cause the at least one processor to include an indicator in the encoded bitstream that indicates that the compressed features were concatenated.

8. A non-transitory computer-readable medium storing computer code that is configured to, when executed by at least one processor, cause the at least one processor to implement a video encoder that:
    receives a bitstream that includes an image;
    partitions the image into a plurality of blocks;
    compresses each of the plurality of blocks by a neural network-based encoder;
    obtains compressed features by obtaining a compressed feature for each block from among the plurality of blocks in the image;
    processes the compressed features by an entropy encoder to generate a first compressed bitstream;
    obtains a plurality of reshaped compressed features by concatenating the compressed features such that a number of reshaped compressed features is less than a number of compressed features, wherein the concatenating the compressed features comprises concatenating the compressed feature blocks into reshaped compressed feature blocks that are larger than the compressed feature blocks, wherein a first reshaped compressed feature block has a square shape and a second reshaped feature block has a rectangular shape, wherein at least two of the reshaped compressed feature blocks are a different size from each other;
    processes the plurality of reshaped compressed features by the entropy encoder to generate a second compressed bitstream; and
    encodes the bitstream including the image based on the second compressed bitstream.

* * * * *